A. C. MEIXELL.
AIR VALVE.
APPLICATION FILED MAY 4, 1916.
1,197,049.
Patented Sept. 5, 1916.
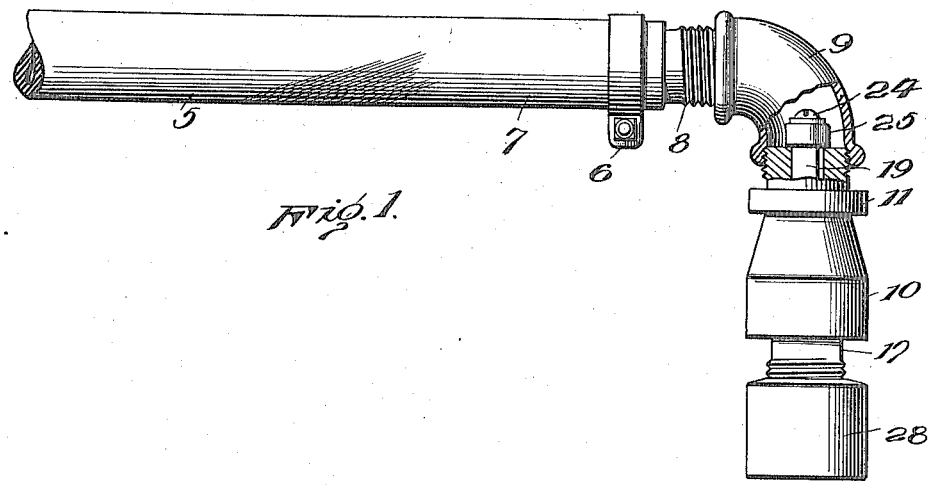
Fig. 1.
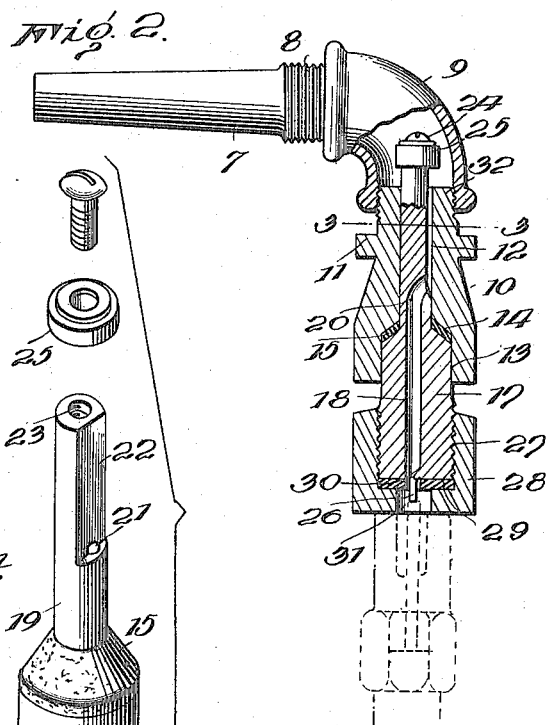
Fig. 2.
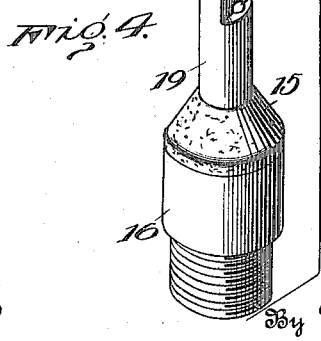
Fig. 3.
Fig. 4.
Witness
C. H. Peppert
Inventor
A. C. Meixell
By Reown & Phelps
Attorneys

UNITED STATES PATENT OFFICE.

ALBERT C. MEIXELL, OF ATLANTA, GEORGIA.

AIR-VALVE.

1,197,049. Specification of Letters Patent. Patented Sept. 5, 1916.

Application filed May 4, 1916. Serial No. 95,385.

*To all whom it may concern:*

Be it known that I, ALBERT C. MEIXELL, a citizen of the United States, residing at Atlanta, in the county of Fulton and State of Georgia, have invented certain new and useful Improvements in Air-Valves, of which the following is a specification.

This invention relates to valves and more particularly to that class of such devices intended to be used as a venting valve for air storage tanks primarily adapted for the inflation of automobile tires or the like in connection with the ordinary type of air inflating valve upon the inner tube of the usual automobile tire, and has for its object the provision of a valve which shall be adapted to reduce to a minimum the period of time required for tire inflation and to embody simplicity of construction with efficiency of operation.

With the foregoing and other objects in view as will from time to time hereinafter appear, this invention consists in the peculiar combination and assembly of the various coöperating elements of a valve as hereinafter described in the following specification and more particularly set forth in the appended claims.

Referring to the accompanying drawings forming a portion of this specification and illustrating the preferred embodiment of the invention and in which the same reference characters indicate the same parts wherever used, Figure 1 is a side elevation partly broken away showing the valve in closed position; Fig. 2 is a section showing the valve in open position; Fig. 3 is a section on line 3, 3 of Fig. 2, and Fig. 4 is a detail perspective showing the various parts in separated relation.

5 designates a flexible tubing of any suitable construction extending from the air tank and adapted to be fastened by means of a collar 6 to a piping member 7 threaded at 8 to receive an L 9 which supports a member 10 having a wrench receiving annulus 11 and which is provided interiorly with a central opening 12 which is provided with an enlargement 13 having a cone-shaped seat 14 converging into the member 12, the cone-shaped seat being adapted to coöperate with a packing ring 15 for a purpose hereinafter set forth.

Adapted to extend into the opening 12 is a valve member designated as a whole by 16 and comprising a relatively large portion 17 provided with a central opening 18 and a cylindrical extension 19 through which the opening 18 extends for a portion of its length to a point where it is curved at 20 and extends outwardly through the wall of the extension 19 to an opening 21.

Adjacent the opening 21 the extension 19 is flattened for a portion of its length at 22, thus leaving an open space in the chamber 12 which is not filled by the extension 19. The extension 19 is provided at its upper end with a threaded opening 23 adapted to receive a suitable screw 24 which is adapted to clamp against the head of the member 19 an annular washer 25 formed of any suitable fibrous or other material normally adapted to seat upon the upper face of the member 10. The lower portion of the opening 18 is provided with a pin 26 extending below the member 17 which is threaded at 27 for the reception of a cap 28 which is provided with a washer 29 provided with a central opening 30 alining with the opening 18 and through which the pin 26 extends into an opening 31 in the cap 28 somewhat larger than the opening 30.

The operation of the device is as follows: When it is desired to inflate a tire the cap 28 is placed over the ordinary inflation valve represented in dotted lines in Fig. 2, the pin 26 engaging the push rod of the valve, whereupon further downward pressure to raise the cap 28 will cause the valve 16 to slide within the opening 13 and seat the packing 15 against the cone-shaped seat 14, thus lifting the washer 25 off of the face of the member 10, as shown in Fig. 2 and permitting air from the tank supplying the tubing 5 to pass down that portion of the chamber 12 which is left open, due to the flattened portion 22 of the cylindrical extension 19 into the opening 21, through the opening 18, and to the tire through the openings 30 and 31, the valve of the tire valve being held open by the pin 26 acting upon the valve push rod. When the tire has been inflated to the desired pressure the valve device is simply lifted off the inflated valve whereupon the washer 25 will seat against the head 23 of the member 10 through the side of the member 16 which slides, due to the air pressure against the washer 25, within the portion 13, thus stopping the flow of air from the tank.

As many changes could be made in the above construction and many apparently widely different embodiments of my invention could be made, without departing from the scope thereof, it is intended that all matter contained in the above description or shown in the accompanying drawing shall be interpreted as illustrative and not in a limiting sense.

Having thus described my invention what I claim as new and desire to secure by Letters Patent is—

1. In a valve, the combination with a casing having a bore of varying diameter, of a valve member extending through said bore, said valve member comprising a relatively large portion having an opening therethrough and externally threaded for a portion of its length, an internally threaded cap on said enlarged portion, said valve member having a portion of smaller diameter than the bore terminating in a valve head adapted to normally close the bore.

2. In a valve, the combination with a casing having a bore of varying diameter, of a valve member extending through said bore, said valve member comprising a relatively large portion having an opening therethrough and externally threaded for a portion of its length, an internally threaded cap on said enlarged portion, said valve member having a portion of smaller diameter than the bore terminating in a valve head adapted to normally close the bore, and means carried by said larger portion adapted to open the needle valve of a tire valve.

3. In a valve, the combination with a casing having a bore of varying diameter, of a valve member extending through said bore, said valve member comprising a relatively large portion having an opening therethrough and externally threaded for a portion of its length, an internally threaded cap on said enlarged portion, said valve member having a portion of smaller diameter than the bore terminating in a valve head adapted to normally close the bore, and means integral with said larger portion adapted to open the needle valve of a tire valve.

In testimony whereof I affix my signature in presence of two witnesses.

ALBERT C. MEIXELL.

Witnesses:
HAROLD KUSAT,
ASA W. CANDLER.

Copies of this patent may be obtained for five cents each, by addressing the "Commissioner of Patents, Washington, D. C."